United States Patent [19]

Tashiro

[11] 4,268,159

[45] May 19, 1981

[54] ELECTROGRAPHIC COPYING APPARATUS

[75] Inventor: Tsuneo Tashiro, Sagamihara, Japan

[73] Assignee: Tokyo Shibaura Denki Kabushiki Kaisha, Kawasaki, Japan

[21] Appl. No.: 56,306

[22] Filed: Jul. 10, 1979

[30] Foreign Application Priority Data

Jul. 18, 1978 [JP] Japan .................................. 53-87260

[51] Int. Cl.³ ........................ G03G 15/00; G01D 15/14

[52] U.S. Cl. ...................................... 355/3 R; 346/160

[58] Field of Search ............. 355/3 R, 14 R; 346/153, 346/160

[56] References Cited

U.S. PATENT DOCUMENTS 3,358,081 12/1967 Young et al. .................... 355/3 R X 3,681,527 8/1972 Nishiyama et al. ............ 355/3 R X 4,080,058 3/1978 Stephany et al. .............. 355/3 R X 4,094,606 6/1978 Camphausen ........................ 355/3 R 4,166,691 9/1979 Ebi et al. ............................... 355/11

*Primary Examiner*—Fred L. Braun

*Attorney, Agent, or Firm*—Cushman, Darby & Cushman

[57] ABSTRACT

A scanner scans a document to produce the document information. A memory stores the document information of many documents and their associated retrieval code data. By specifying the retrieval code data, the document information related to the retrieval code data is read out from the memory. An optical fiber cathode ray tube converts the read-out document information and associated retrieval code data into a corresponding optical image. An electrographic printer reproduces the optical image in the form of a visual image including the document and its related retrieval code.

6 Claims, 4 Drawing Figures

ELECTROGRAPHIC COPYING APPARATUS

BACKGROUND OF THE INVENTION

The invention relates to an electrographic copying apparatus and, more particularly, to the one capable of storing and retrieving document information.

Micro-film systems have been used for storing and retrieving technical information such as patent publications. Recently, an electrographic copying apparatus has been developed for the same purposes, which uses an optical scanner and a memory device, and provides a hard copy of the necessary information by using an electrophotograph, if needed. According to the latter apparatus, however, an operator cannot check if the hard copy taken out is the one desired to be retrieved or not.

SUMMARY OF THE INVENTION

Accordingly, an object of the invention is to provide an electrographic copying apparatus capable of reliable check as to whether a hard copy obtained is the one desired to be retrieved or not.

According to the invention, there is provided an electrographic copying apparatus comprising: a scanner for optically scanning a document; a memory for storing the document information obtained by the scanner and the retrieval code data keyed in from a key board, for example; means for reading out from the memory desired document information and the retrieval code data; and means for reproducing the read-out document information by the electrophotography in the form of a hard copy with a printed symbol or a numeral representing the retrieval code data.

Other objects and features of the invention will be apparent from the following description taken in connection with the accompanying drawings, in which:

DETAILED DESCRIPTION OF THE PREFERRED EMBODIMENT

Figure 1:
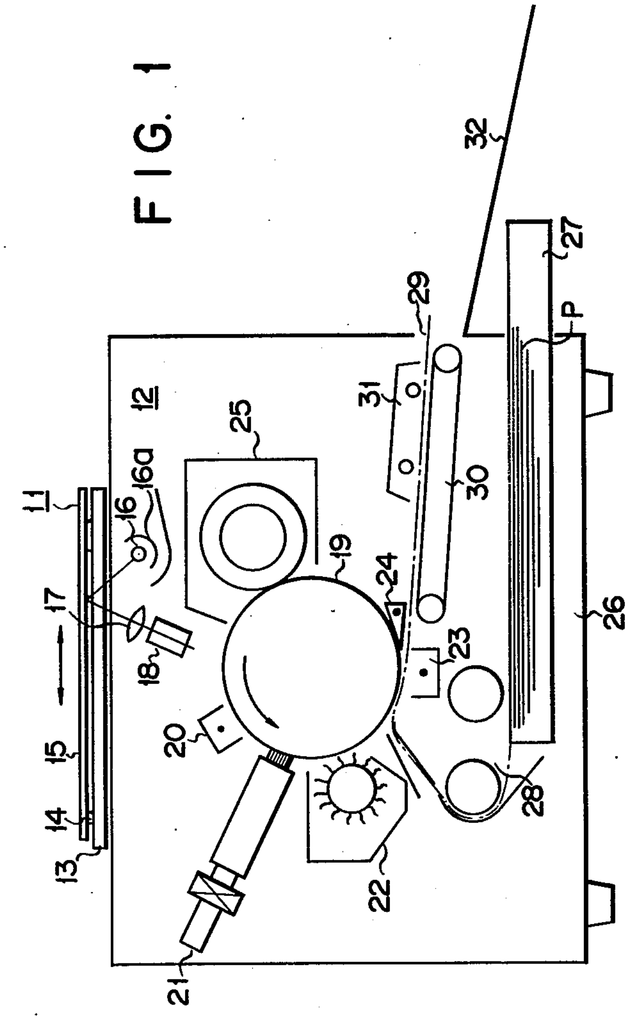
FIG. 1 shows a brief structure of an electrographic copying apparatus according to an embodiment of the invention.

Referring now to FIG. 1, an electrographic copying apparatus according to the invention is provided at the upper portion with a reciprocally movable document table 11. An optical system 12 is disposed below the document table 11, as shown. The document table 11 and the optical system 12 cooperate to constitute a scanner. The document table 11 comprises a movable transparent plate 13 and a document holder 15 which is laid above the transparent plate 13 and holds a document 14 placed on the transparent plate 13. The optical system 12 comprises an illuminating lamp 16 for illuminating the document 14 through the transparent plate 13, a reflector **16*a* provided at the rear side of the lamp 16, a lens 17 for collecting the light rays reflected from the document 14, and a solid-state image pickup device for converting the reflected light rays collected into a corresponding electrical signal, such as a charge coupled device 18**.

A photoconductive drum 19 is located at the center of the electrographic copying apparatus is so constructed that photoconductive material such as selenium is deposited on an aluminum drum, for example. Disposed around the drum 19 are a corona charger 20, a printing tube, for example, an optical fiber cathode ray tube 21, a developing magnetic brush (developer) 22, a transfer corona charger 23, a paper separator 24 for separating an image transferred paper, and a drum cleaning device 25. A paper feeder 26 is located at the bottom of the copying apparatus. The paper feeder 26 comprises a paper cassette 27 for accommodating papers P and a paper feeding roller 28 for feeding the paper P sheet by sheet from the cassette 27. A paper transporting conveyor 30 is disposed between the transfer corona charger 23 and the paper exhausting port 29, confronting a fixing device 31. The copied paper after it is fixed by the fixing device 31 is sent out into a tray 32 by the conveyor 30.

Figure 2:
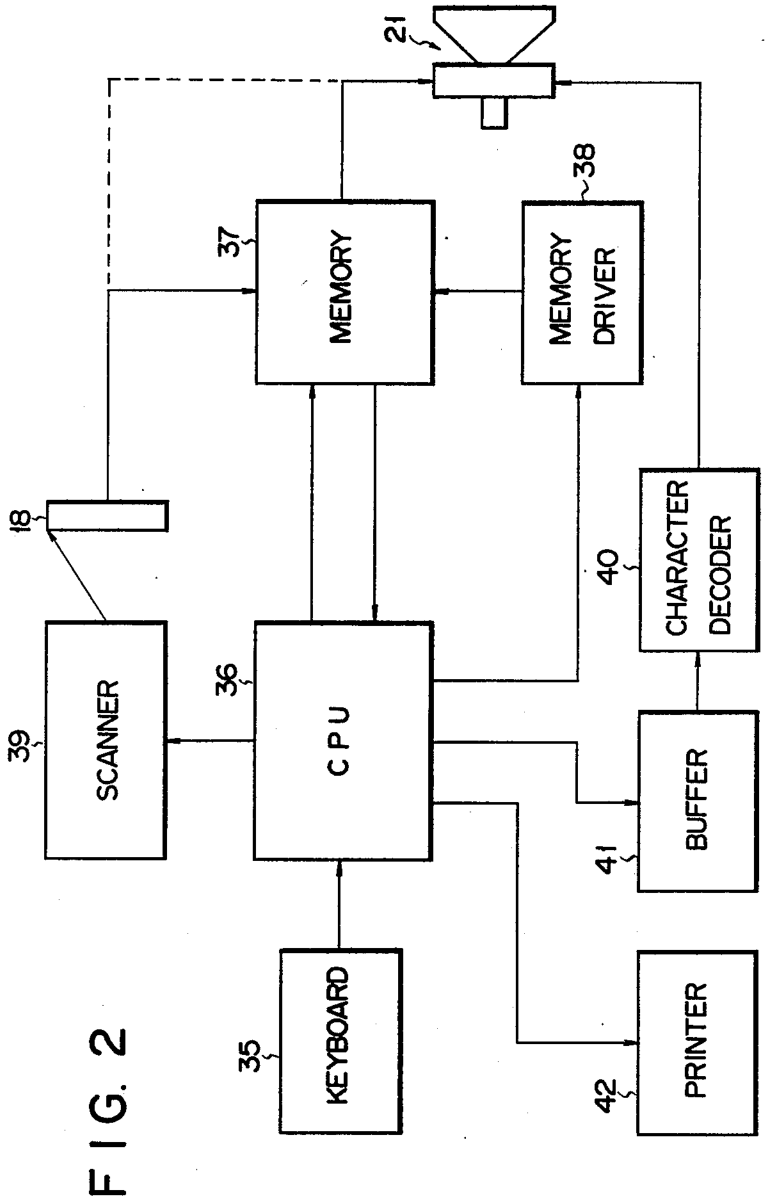
FIG. 2 shows a block circuit of the electrographic copying apparatus shown in FIG. 1.

The electrical system of the electrographic copying apparatus will be described with reference to FIG. 2. A keyboard 35 located on a proper position of the copying apparatus is connected to a central processing unit (CPU) 36 which is further connected to a memory 37, a memory driver 38, and a scanner 39 and issues operation commands to those circuits. The output of the CCD 18 in the scanner 39 including the document table 11 and the optical system 12 is applied as an write-in input to the memory 37. The memory 37 is of a magnetic tape type and is driven by a memory driver 38. The output of the memory 37 is coupled with the optical fiber cathode ray tube 21. The optical fiber cathode ray tube is connected to a character decoder 40. The character decoder 40, which will be described later, is provided to convert the retrieval code data assigned to the document data read out from the memory 37 into symbols, alphanumeric characters, katakana (Japanese phonetic symbols), Chinese Characters, and the like in accordance with ASCII codes, JIS codes, ISO codes or the like. The retrieval code data is stored in a buffer 41, through the CPU 36.

Figure 3:
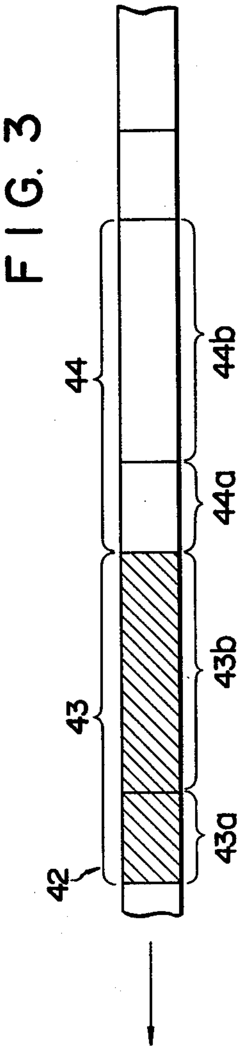
FIG. 3 shows a format of the document information stored in a magnetic tape.

The operation of the electrographic copying apparatus follows. To store the printed information on the document 14, the document 14 is placed on the transparent plate 13 and then the keyboard 35 is operated. A specific retrieval code is previously assigned to the document 14 to be stored. The retrieval code is keyed in. Upon depression of a start button on the keyboard, the CPU 36 gives a drive command to the memory driver so that the memory 37 operates to search a not-stored portion 44 on the magnetic tape 42 shown in FIG. 3. The search may be made in the same manner as the address selection in an ordinary computer technology. A comparator, for example, is used to check whether the information read out from the magnetic tape is stored or not-stored information. When the not-stored portion 44 is found, the CPU 36 issues a start command to the scanner 39. Upon receipt of the start command, the document table 11 of the scanner 39 starts to move while the lamp 16 lights up to illuminate the moving document. At this time, the retrieval code data inputted from the keyboard 35 is written into the head **44*a* of the not-stored portion 44**.

The light rays reflected from the document 14 is incident upon the CCD 18, through a focussing lens.

Then, the CCD 18 converts an optical image representing a printed pattern on the document 18 into a corresponding video signal. The video signal is applied to the memory 37 and is stored at the document information storing portion 44*b* of the magnetic tape 42. The storing operation of the document information is continued until the table 11 completes its traveling. At the end of the table travel, the scanner 39 gives a signal representing the end of the scanning to the CPU 36. In response to the signal, the CPU 36 gives a stop command to the memory driver 38 and the memory 37. Then, the document table 11 returns to its original position and the lamp 16 goes out. The document information is stored in the above-mentioned manner.

When it is desired to obtain a copy of the document simultaneously with the storing of the document information, a printing unit for a printer 42, including an optical fiber cathode ray tube 21 is driven simultaneously with the storing operation. In this case, the photoconductive drum 19 rotates in synchronism with the horizontal movement of the table 11. The document information signal of the CCD 18 is supplied to the memory 37 and the optical fiber cathode ray tube 21 via a signal passage indicated by a broken line. The cathode ray tube 21 reproduces an optical image corresponding to a document information signal. The image illuminates the surface of the drum 19 which has been charged by the corona charger 20. As a result, an electrostatic latent image corresponding to the optical image is formed on the surface of the drum 19. The electrostatic latent image is transformed into a toner image by the developing magnetic brush 22. The toner image is then transferred onto a paper P fed from the paper feeder 26 by the transfer corona charger 23. The toner image is fixed by the fixing device 31 on the way to the paper exhausting port 29. The paper with the fixed image is transferred to the tray 32.

As in the above case of the simultaneous operation of storing and printing, the keyboard 35 sets a simultaneous print mode so that the CPU 36 issues simultaneously a start command to the scanner 39 and the printer 42 to drive them. The document information signal from the CCD 18 is applied to the memory 37 and the optical fiber cathode ray tube 21. The document information and the retrieval code information stored in the buffer 41 are read out and are applied to the optical fiber cathode ray tube 21. In this case, the retrieval code information is decoded by the character decoder 40. As result, the retrieval code, together with the document information, is printed on the paper P. In the simultaneous print mode, if the memory operation is stopped, only the printing operation may be performed.

A print mode follows in which the document information stored by the simultaneous print mode or the storing mode is read out and is printed. A retrieval code of the document information to be printed is keyed in and the print mode is set. Upon the operation of the keyboard, the CPU 36 issues a command to search the corresponding retrieval code. Upon the command, the memory driver 38 operates to search the retrieval code information corresponding to the desired document information on the magnetic type 42, for example, a code information 43*a*. When the code information 43*a* is detected, the CPU 36 issues a command to store the code information in the buffer 41 and at the same time to read out the document information 43*b* associated with the code information.

Also, the CPU 36 issues a command to start the printer 42. Then, the photoconductive drum 19 starts to rotate and the cathode ray tube 21 illuminates the surface of the drum 19 with the document information 43*b*. After this, a series of printing operations such as developing, transferring, and fixing are performed, as in the simultaneous print mode. Also in this case, the retrieval code information 43*a* read out from the buffer 41 is decoded by the character decoder 40 into a corresponding retrieval code and then is applied to the optical fiber cathode ray tube 21. The cathode ray tube 21 forms a latent image on the drum surface to print the retrieval code on the paper P. If the printing of the retrieval code information is not necessary, the read-out of the information code from the buffer 41 is prevented. A command directing no print may be given by the keyboard 35. The retrieval code may be printed on a proper position on the paper by properly setting the read-out timing of the retrieval code information from the buffer 41.

As described above, the electrographic copying apparatus according to the invention may store a large amount of document information with the associated retrieval code data into the memory. If a copy of the document is desired, it is printed on a paper by keying in the retrieval code information associated with the desired document. In this case, the retrieval code may also be printed on the paper, together with the document information. Therefore, an operator may check as to whether the printed document is the desired document or not.

In the above-mentioned embodiment, a magnetic tape is used for the memory; however, it may be replaced by a magnetic disc or an optical memory such as an optical video disc.

Figure 4:
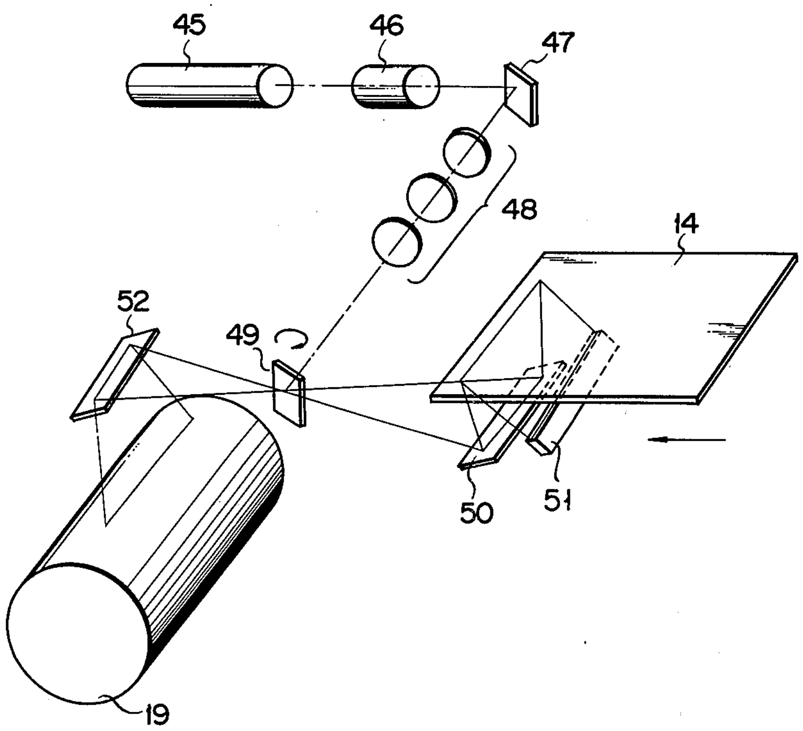
FIG. 4 schematically illustrates an optical system used in the electrographic copying apparatus according to the invention.

Turning now to FIG. 4, there is shown an example of an optical system for scanning the document and performing an exposure of the drum surface by using a laser ray. As shown, a laser modulator 46 and a fixed mirror 47 for deflecting the laser ray from a laser tube 45 are disposed on the optical path of the laser tube 45. On the laser ray path deflected by the mirror 47 are disposed a lens system 48 and a rotating mirror 49. A rotating mirror 49 directs the laser path to a document scanning mirror 50 or an exposure mirror 52. A light receiving device 51 is disposed adjacent to the document scanning mirror 50. The exposure mirror 52 is disposed so as to lead the laser ray to the photoconductive drum 19. As illustrated in FIG. 1, disposed around the photoconductive drum 19 are the charging charger 20, the developer 22, the transfer charger 23, the cleaning device 25 and the like. The operations of those devices are as illustrated in FIG. 4. To store the document information by the laser ray, the rotating mirror 49 is moved so as to deflect the laser ray to the document scanning mirror 50 and no modulating signal is applied from the memory 37 or the light receiving device 18 to the laser modulator 46. Under this condition, when the laser tube 45 emits a laser ray, the ray straightly passes through the laser modulator 46 to reach the fixed mirror 47. The laser ray is deflected by the fixed mirror to pass through lens system 48 and to reach the mirror 49. As shown, the rotating mirror 49 is moved to the side of the document scanning mirror 50 so that the laser ray is deflected to the mirror 50 and then the mirror 49 is swung so that the laser ray scans the mirror 50. The laser ray incident upon the mirror 50 illuminates the moving document 14. The reflected laser ray reflected from the document 14 is received by the light receiving device 51 and is converted into a corresponding document information. The document information is stored in the memory 37, as referred to with relation to FIG. 2.

Explanation will be given of an operation that the document information stored in the memory 37 is read out and a copy of the document bearing such information is obtained. In this case, the rotating mirror 49 is moved so that the laser ray is deflected to the exposure mirror 52 and swung so that the laser ray scans the mirror 52 while a signal representing the document information read out from the memory is applied to the laser modulator 46. Under this condition, when the laser tube 45 emits a laser ray, the laser ray is modulated by the laser modulator 46 in accordance with the document information. The modulated laser ray passes through a route having the fixed mirror 47, the lens system 48, the rotating mirror 49 and the exposure mirror 52 and then illuminates the surface of the photoconductive drum 19. As a result, an electrostatic latent image of the document is formed on the drum surface. The latent image is developed by the developer into a corresponding toner image. The succeeding printing process proceeds in the same manner as that of FIG. 1. By using the laser ray, the noiseless image information of the document is obtained and hence a corresponding image printed is distinct. It is evident that the retrieval code may be printed on the copy also in this embodiment.

What is claimed is:

1. An electrographic copying apparatus comprising:

a scanner for scanning individual documents and providing document information;

means for generating retrieval code data corresponding to the documents;

memory means for (a) storing the retrieval code data from said retrieval code data generating means and (b) storing document information from said scanner in correspondence with said retrieval code data;

means for selecting a desired one of said retrieval code data and for reading out from said memory means the document information corresponding to the selected retrieval code data; and an electrographic printer including means for converting said selected retrieval code data and said document information read-out from said memory means into a corresponding optical image.

2. An electrophotographic copying apparatus according to claim 1, in which said scanner includes a document table for holding and carrying the document, a lamp for illuminating the document, and a light receiving device for converting the reflected light ray into a corresponding document information.

3. An electrographic copying apparatus according to claim 1, in which said converting means is an optical fiber cathode ray tube for transforming the document information into an optical image.

4. An electrographic copying apparatus according to claim 1, in which said electrographic printer includes a photoconductive drum, a charger for charging said photoconductive drum, an exposure means for forming an electrostatic latent image corresponding to the optical image on the surface of said charged photoconductive drum, a developer for developing the electrostatic latent image into a visual image, a transfer means for transferring the visual image onto a paper, and a fixing means for fixing the visual image transferred.

5. An electrographic copying apparatus according to claim 1, in which said memory means is a memory device using a magnetic tape.

6. An electrographic copying apparatus according to claim 1, in which said scanner includes a document table for holding and carrying the document, a laser tube for producing a laser ray, an optical system for guiding the laser ray from said laser tube into said document, and photographing device for converting the laser ray reflected from the document into a corresponding electrical signal, and said electrographic printer includes a laser modulator disposed on an optical path of said laser tube for modulating the laser ray in accordance with the document information, and means for forming an optical image by the laser ray modulated by said laser modulator.

* * * * *